US009550424B2

(12) United States Patent
Goldwin et al.

(10) Patent No.: US 9,550,424 B2
(45) Date of Patent: Jan. 24, 2017

(54) MOUNTING STRUCTURE FOR SUPPORTING PANTOGRAPH IN MACHINE (71) Applicant: Caterpillar Inc., Peoria, IL (US)

(72) Inventors: Nirmal Goldwin, Bangalore (IN); Zachary R. Carter, Decatur, IL (US); Pathik Patel, Decatur, IL (US); Christopher A. Willey, Decatur, IL (US); Vipin Kalathil, Bangalore (IN); Sai R. Rachakonda, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/015,147

(22) Filed: Feb. 4, 2016

(65) Prior Publication Data

US 2016/0152142 A1    Jun. 2, 2016

(51) Int. Cl.
*B60L 5/24* (2006.01)
*B60L 5/18* (2006.01)
*B60L 5/06* (2006.01)
*B60L 5/22* (2006.01)
*B60L 5/08* (2006.01)
*B60L 5/36* (2006.01)

(52) U.S. Cl.
CPC .. *B60L 5/24* (2013.01); *B60L 5/06* (2013.01); *B60L 5/08* (2013.01); *B60L 5/18* (2013.01); *B60L 5/22* (2013.01); *B60L 5/36* (2013.01)

(58) Field of Classification Search
CPC ................. B60L 5/24; B60L 5/06; B60L 5/08; B60L 5/36; B60L 5/22; B60L 5/18
USPC ............................................ 191/65, 59.1, 64
See application file for complete search history.

(56) References Cited

U.S. PATENT DOCUMENTS

| 522,224 | A | * | 7/1894 | Lycett | B60L 5/32 |
| | | | | | 105/238.1 |
| 3,529,103 | A | * | 9/1970 | Wortman | B60L 5/14 |
| | | | | | 191/50 |
| 3,795,777 | A | * | 3/1974 | Leger | B60L 5/22 |
| | | | | | 191/66 |
| 8,008,877 | B2 | | 8/2011 | Fushiki et al. | |
| 8,577,530 | B2 | * | 11/2013 | Ruth | B62D 1/02 |
| | | | | | 701/22 |
| 8,944,227 | B2 | | 2/2015 | Doddakula et al. | |
| 9,403,526 | B2 | * | 8/2016 | Saito | B60L 5/045 |

(Continued)

FOREIGN PATENT DOCUMENTS

| WO | 2012169359 | 12/2012 |
| WO | 2013136564 | 9/2013 |
| WO | 2015075773 | 5/2015 |

*Primary Examiner* — Eret McNichols (57) ABSTRACT

A mounting structure for supporting one or more pantographs in a machine is disclosed. The mounting structure includes a bottom support structure and a middle support structure removably mounted on the bottom support structure. The middle support structure includes a pair of secondary front legs removably coupled to the pair of primary front legs. The middle support structure includes reinforcement members for removably connecting the top portion of one of a secondary front leg and a rear leg with a deck. The mounting structure includes a top platform removably mounted on the middle support structure for supporting the pantographs. The top platform includes a first supporting member and a second supporting member. Each of the first supporting member and the second supporting member is supported along a first side arm and a second side arm of the deck, respectively.

1 Claim, 5 Drawing Sheets

(56) References Cited

U.S. PATENT DOCUMENTS

| | | | | |
|---|---|---|---|---|
| 2013/0105264 A1* | 5/2013 | Ruth | ................... | B60L 5/26 |
| | | | | 191/59.1 |
| 2013/0169469 A1 | 7/2013 | Mitsuta et al. | | |
| 2013/0264163 A1 | 10/2013 | Mishra et al. | | |
| 2014/0027229 A1* | 1/2014 | Tojima | ................. | B60L 5/24 |
| | | | | 191/64 |
| 2014/0110205 A1* | 4/2014 | Dronnik | ................ | B60L 5/08 |
| | | | | 191/59.1 |
| 2015/0136555 A1* | 5/2015 | Kanazawa | ............. | B60L 5/28 |
| | | | | 191/59.1 |

\* cited by examiner

MOUNTING STRUCTURE FOR SUPPORTING PANTOGRAPH IN MACHINE

TECHNICAL FIELD

The present disclosure relates to a mounting structure for a machine, and more specifically relates to the mounting structure for supporting a pantograph in the machine.

BACKGROUND

Machines, such as vehicles driven by an electric drive operating at various work sites, rather than generating power on-board, usually receive electricity from an external source through overhead power lines. An electric vehicle may include one or more pantographs for receiving power from the overhead power lines. For supporting the pantograph, a mounting structure is generally provided on the electric vehicle. The mounting structure may include a plurality of horizontal, vertical, and angled bars being connected to each other by permanent joints, forming a bottom portion, a middle portion, and a platform assembly for supporting the pantograph. The large number of bars used in the mounting structure adds to the weight of the mounting structure and in turn of the electric vehicle. Such a complicated structure of the mounting structure blocks a field of view of an operator as well while operating the machine. Further, owing to the weight, size, and complexity concerns, transportation, installation, and uninstallation of the mounting structure become a challenging and cumbersome task. Moreover, the platform assembly is supported on the middle portion by a cantilever-type connection. As a result of the cantilever-type connection, the platform assembly extends out of the electric vehicle causing inconvenience while the vehicle is in motion.

SUMMARY OF THE DISCLOSURE

In one aspect of the present disclosure, a mounting structure for supporting one or more pantographs in a machine is provided. The mounting structure includes a bottom support structure. The bottom support structure includes a pair of primary front legs and a first horizontal arm. The first horizontal arm is connected to a top portion of the pair of primary front legs. The bottom support structure includes a pair of supporting legs connected between the first horizontal arm and a bottom portion of the pair of primary front legs. The pair of primary front legs, the first horizontal arm, and the pair of supporting legs are coupled to each other by a welding connection. The mounting structure includes a middle support structure. The middle support structure is removably mounted on the bottom support structure. The middle support structure includes a pair of secondary front legs detachably coupled to the pair of primary front legs of the bottom support structure by a fastening member. The middle support structure also includes a pair of rear legs coupled to the pair of secondary front legs by a deck. The deck is disposed on a top portion of the pair of secondary front legs and the pair of the rear legs. The deck includes a front horizontal arm, a rear horizontal arm, a first side arm, and a second side arm. The middle support structure includes at least one support bar connected between one of the pair of secondary front legs and one of the pair of rear legs. The middle support structure includes at least one reinforcement member. The at least one reinforcement member is disposed along a length of the deck, for connecting the top portion of one of a secondary front leg and a rear leg with the deck. Further, the pair of secondary front legs, the pair of rear legs, the at least one support bar, and the deck are detachably coupled to each other by a fastening connection. The mounting structure also includes a top platform. The top platform is removably mounted on the middle support structure for supporting the one or more pantographs. The top platform includes a first supporting member and a second supporting member spaced apart from the first supporting member. Each of the first supporting member and the second supporting member is supported along the first side arm and the second side arm of the deck of the middle support structure, respectively.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. Any reference to elements in the singular is also to be construed to relate to the plural and vice-versa without limiting the scope of the disclosure to the exact number or type of such elements unless set forth explicitly.

Figure 1:
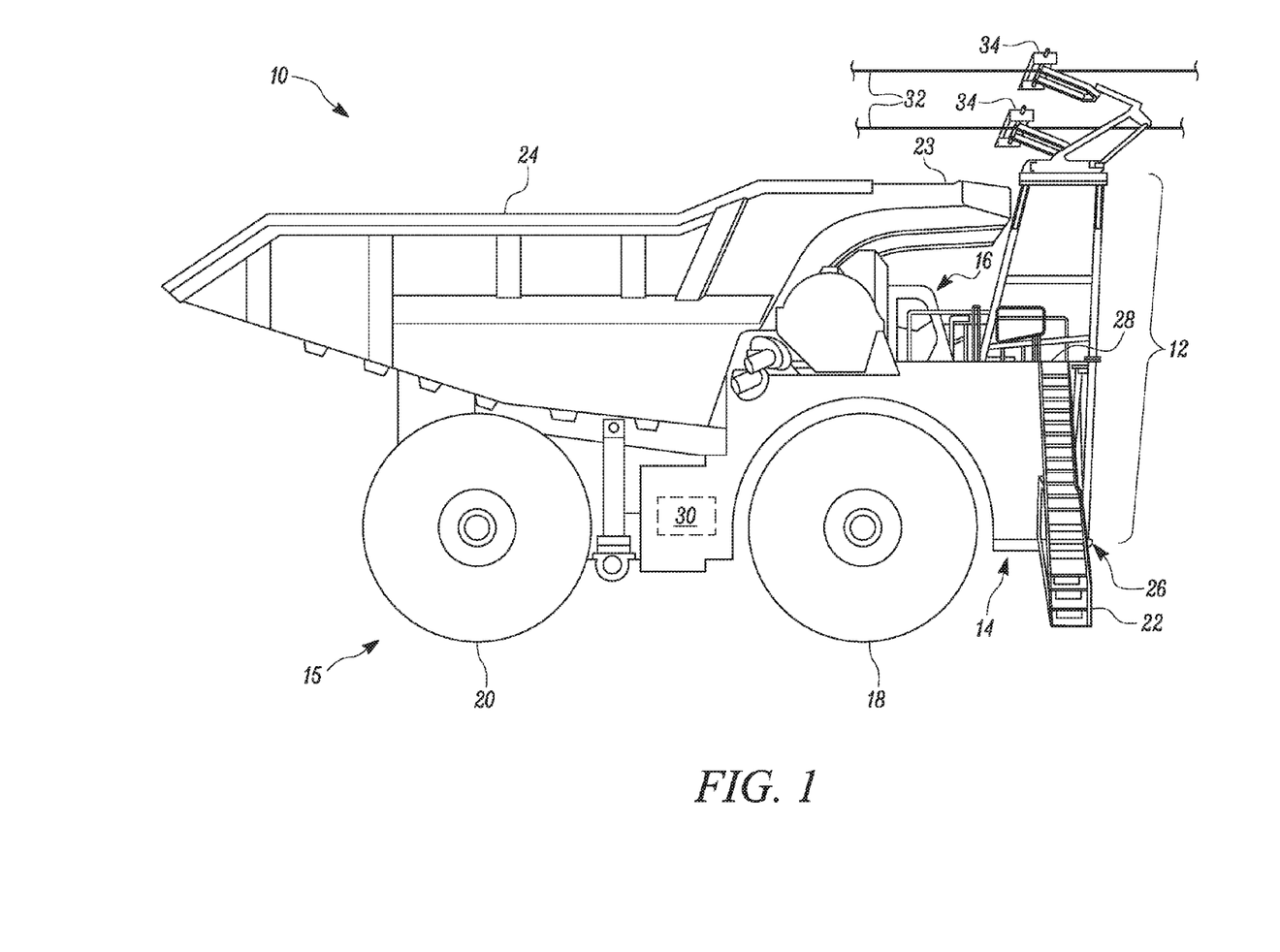
FIG. 1 is a side view of a machine with a mounting structure, according to an embodiment of the present disclosure.

FIG. 1 is a side view of a machine 10 with a mounting structure 12, according to one embodiment of the present disclosure. The machine 10 is a mining truck. The machine 10 may include, but is not limited to, a machine that performs operations associated with industries, such as mining, construction, farming, transportation, or any other industry known in the art. In one example, the machine 10 may be a tracked vehicle or a wheeled vehicle, such as, a locomotive, an off-highway truck, a train, and a tram.

The machine 10 includes a frame 14 for supporting various components of the machine 10, a set of ground engaging members 15 for propelling the machine 10, an operator cabin 16 for accommodating an operator, a ladder 22 for assisting the operator to access the operator cabin 16, a canopy 23 for protecting the operator cabin 16 from debris, and a payload carrier 24 supported on the frame 14.

The frame 14 includes a bumper 26 and a platform 28 for supporting the mounting structure 12 on the machine 10. The ground engaging members 15 include a front set of ground engaging members 18 and a rear set of ground engaging members 20. The operator cabin 16 is supported on the frame 14 of the machine 10. The operator cabin 16 includes a plurality of input devices (not shown) for controlling and monitoring operations of the machine 10. The input devices may include, but are not limited to, a pushbutton, a control lever, and a steering wheel.

The canopy 23 is provided to safeguard the operator cabin 16 from debris. More specifically, the canopy 23 protects the operator accommodated in the operator cabin 16 from debris. In the present embodiment, the canopy 23 is kept smaller in size compared to a conventional canopy, to accommodate the mounting structure 12 on the machine 10. In one example, the canopy 23 may be removed to accommodate the mounting structure 12 on the machine 10.

Further, the payload carrier 24 is pivotally connected to the frame 14 for carrying a payload. The payload carrier 24 may be tilted between a lowered position and a lifted position, to dump the payload from the payload carrier 24.

The machine 10 further includes an electric drive 30 for propelling the ground engaging members 15. The electric drive 30 receives electric power from a pair of overhead trolley lines 32, via two pantographs 34. The pantographs 34 are positioned on the mounting structure 12 of the machine 10.

In one example, the electric drive 30 may propel the front set of ground engaging members 18. In another example, the electric drive 30 may propel the rear set of ground engaging members 20. In one example, the machine 10 may include an engine, such as a compression ignition internal combustion engine. The machine 10 may be propelled by a blend of electrical power from the electric drive 30 and mechanical power from the engine. In another example, the machine 10 may be powered solely by the electric drive 30.

Figure 2:
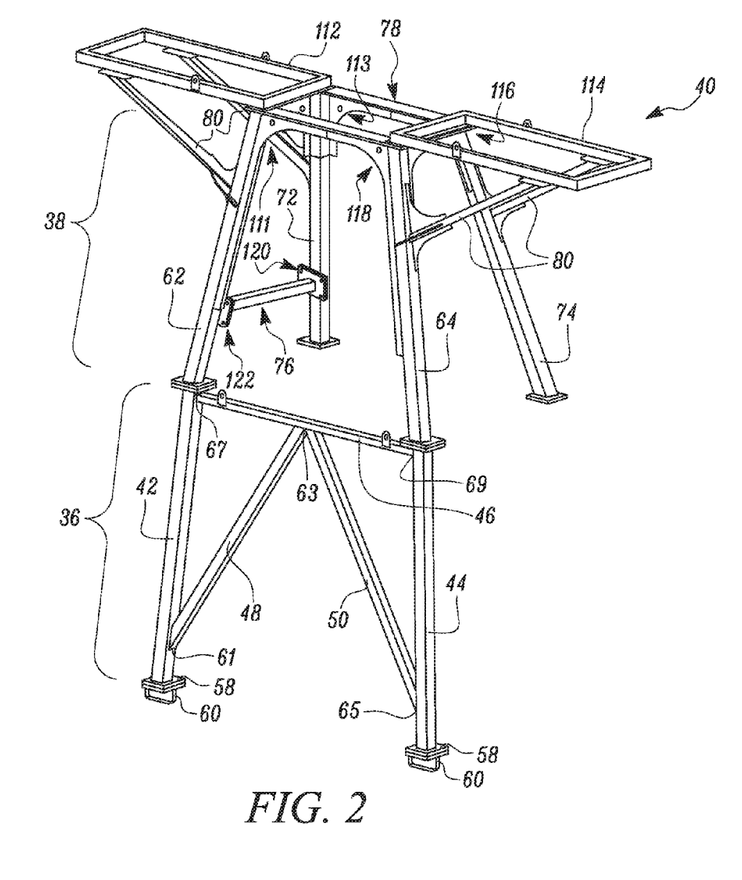
FIG. 2 is a perspective view of the mounting structure of FIG. 1.

FIG. 2 is a perspective view of the mounting structure 12. The mounting structure 12 includes a bottom support structure 36, a middle support structure 38 removably mounted on the bottom support structure 36, and a top platform 40 removably mounted on the middle support structure 38. The bottom support structure 36 is to be supported on the bumper 26 and the platform 28 of the machine 10, thereby supporting the mounting structure 12 on the machine 10. The top platform 40 of the mounting structure 12 supports the pantographs 34 to receive the electric power from the pair of overhead trolley lines 32.

Figure 3:
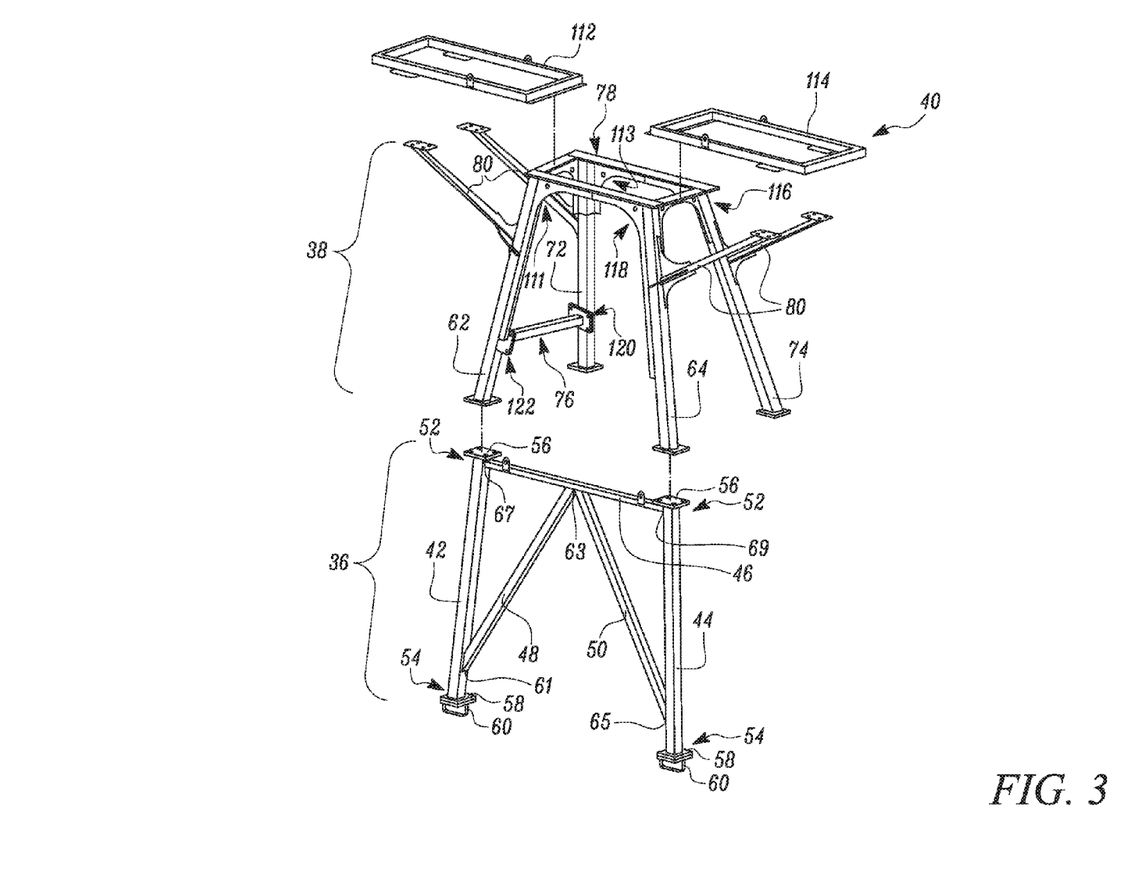
FIG. 3 is an exploded view of the mounting structure of FIG. 1.

FIG. 3 is an exploded view of the mounting structure 12. Referring to FIGS. 2 and 3, the bottom support structure 36 includes a pair of primary front legs 42, 44, a first horizontal arm 46, and a pair of supporting legs 48, 50. Each of the primary front legs 42, 44 include a top end 52 and a bottom end 54. The top end 52 of the primary front legs 42, 44 includes a first pair of mounting plates 56. The bottom end 54 of the primary front legs 42, 44 includes a second pair of mounting plates 58 coupled to a pair of mounting elements 60. The pair of mounting elements 60 facilitates mounting of the bottom support structure 36 on the bumper 26 of the machine 10. In one example, the pair of mounting elements 60 may be welded to the bumper 26 of the machine 10.

The first horizontal arm 46 of the bottom support structure 36 is coupled to the top end 52 of the primary front legs 42, 44. The supporting legs 48, 50 are coupled between the first horizontal arm 46 and the bottom end 54 of the primary front legs 42, 44. The first horizontal arm 46 and the supporting legs 48, 50 provide support and rigidity to the bottom support structure 36. The pair of primary front legs 42, 44, the first horizontal arm 46, and the pair of supporting legs 48, 50 are coupled to each other by welding connections 61, 63, 65, 67, 69.

Figure 4:
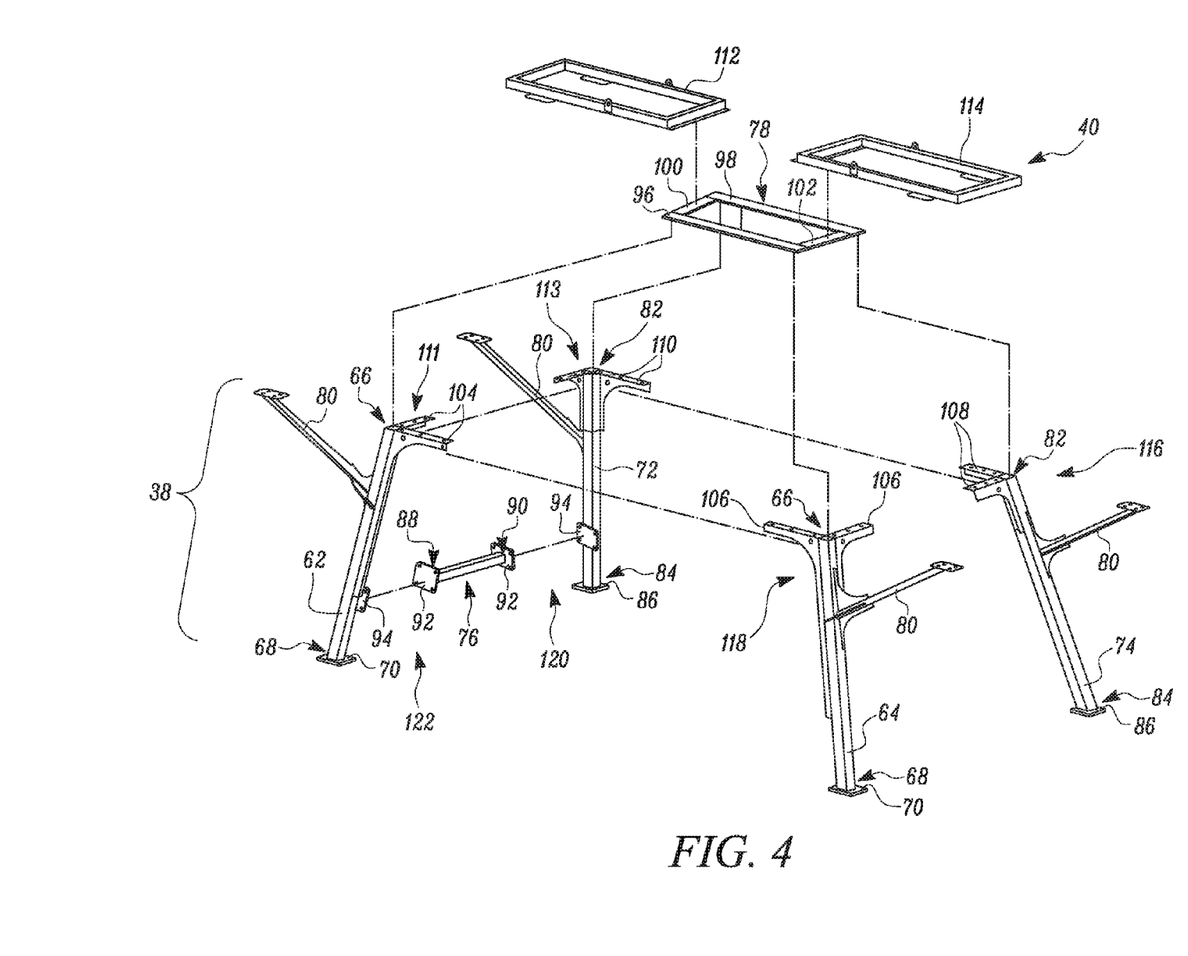
FIG. 4 is an exploded view of a middle support structure and a top platform of the mounting structure of FIG. 1.

FIG. 4 is an exploded view of the middle support structure 38 and the top platform 40 of the mounting structure 12. Referring to FIGS. 2, 3, and 4, the middle support structure 38 includes a pair of secondary front legs 62, 64 removably coupled to the primary front legs 42, 44 of the bottom support structure 36. Each of the pair of secondary front legs 62, 64 includes a top portion 66 and a bottom portion 68. The bottom portion 68 includes a third pair of mounting plates 70. The third pair of mounting plates 70 is provided to couple the secondary front legs 62, 64 with the primary front legs 42, 44. The third pair of mounting plates 70 is fastened to the second pair of mounting plates 58 of the primary front legs 42, 44, thereby coupling the middle support structure 38 with the bottom support structure 36.

The middle support structure 38 further includes a pair of rear legs 72, 74, a support bar 76, a deck 78, and a plurality of extended support arms 80. The pair of rear legs 72, 74 includes a top portion 82 and a bottom portion 84. The bottom portion 84 includes a fourth pair of mounting plates 86 provided to facilitate mounting of the pair of rear legs 72, 74 on the platform 28 of the machine 10.

The support bar 76 includes a first end 88 and a second end 90. The support bar 76 also includes a fifth pair of mounting plates 92 disposed at the first end 88 and the second end 90 of the support bar 76. The support bar 76 is coupled between one of the pair of secondary front legs 62, 64 and one of the pair of rear legs 72, 74. In particular, the support bar 76 is coupled between the secondary front leg 62 and the rear leg 72. In one example, the support bar 76 may be coupled between the secondary front leg 64 and the rear leg 74. The fifth pair of mounting plates 92 is fastened to a sixth pair of mounting plates 94 provided on the secondary front leg 62 and the rear leg 72.

In the present embodiment, the deck 78 is disposed on the top portion 66 of the secondary front legs 62, 64 and the top portion 82 of the rear legs 72, 74. The deck 78 is a rectangular structure delineated by a front horizontal arm 96, a rear horizontal arm 98, a first side arm 100, and a second side arm 102. The front horizontal arm 96 is disposed on the top portion 66 of the secondary front legs 62, 64. The rear horizontal arm 98 is disposed on the top portion 82 of the rear legs 72, 74. The first side arm 100 is disposed on the top portion 66 of the secondary front leg 62 and the top portion 82 of the rear leg 72. The second side arm 102 is disposed on the top portion 66 of the secondary front leg 64 and the top portion 82 of the rear leg 74.

The deck 78 is fastened to the secondary front legs 62, 64 and the rear legs 72, 74, via a first pair of reinforcement members 104, a second pair of reinforcement members 106, a third pair of reinforcement members 108, and a fourth pair of reinforcement members 110. Therefore, the first pair of reinforcement members 104, the second pair of reinforcement members 106, the third pair of reinforcement members 108, and the fourth pair of reinforcement members 110 are disposed along a length of the deck 78. The first pair of reinforcement members 104 is rigidly connected to the secondary front leg 62. More specifically, the first pair of reinforcement members 104 is welded to the secondary front leg 62. The first pair of reinforcement members 104 is provided to removably fasten the secondary front leg 62 with the front horizontal arm 96 and the first side arm 100. The first pair of reinforcement members 104 is disposed along the secondary front leg 62 in such a manner that a length of the first pair of reinforcement member 104 extends beyond a mid point of the secondary front leg 62.

The second pair of reinforcement members 106 is rigidly connected to the secondary front leg 64 of the middle support structure 38. More specifically, the second pair of reinforcement members 106 is welded to the secondary front leg 64 of the middle support structure 38. The second pair of reinforcement members 106 is provided to removably fasten the secondary front leg 64 with the front horizontal arm 96 and the second side arm 102. The second pair of reinforcement members 106 is disposed along the secondary front leg 64 in such a manner that a length of the second pair of reinforcement member 106 extends beyond a mid point of the secondary front legs 64.

Further, the third pair of reinforcement members 108 is rigidly connected to the rear leg 74 of the middle support structure 38. More specifically, the third pair of reinforcement members 108 is welded to the rear leg 74 of the middle support structure 38. The third pair of reinforcement members 108 is provided to removably fasten the rear leg 74 with the rear horizontal arm 98 and the second side arm 102. The fourth pair of reinforcement members 110 is rigidly connected to the rear leg 72 of the middle support structure 38. More specifically, the fourth pair of reinforcement members 110 is welded to the rear leg 72 of the middle support structure 38. The fourth pair of reinforcement members 110 is provided to removably fasten the rear leg 72 with the rear horizontal arm 98 and the first side arm 100. The pair of secondary front legs 62, 64, the pair of rear legs 72, 74, the support bar 76, and the deck 78 are detachably coupled to each other by fastening connections 111, 113, 116, 118, 120, 122. In one example, the fastening connections 111, 113, 116, 118, 120, 122 may include nut-and-fastener connections.

The top platform 40 is removably mounted on the middle support structure 38 of the mounting structure 12. The top platform 40 includes a first supporting member 112 and a second supporting member 114. The first supporting member 112 and the second supporting member 114 include a rectangular structure. The first supporting member 112 is removably fastened to the second side arm 102 of the deck 78. The first supporting member 112 is supported along a length of the second side arm 102 (FIG. 4). The second supporting member 114 is removably fastened to the first side arm 100 of the deck 78. The second supporting member 114 is supported along a length of the first side arm 100. Both the first supporting member 112 and the second supporting member 114 support the pantographs 34 to receive the electric power from the over head trolley lines 32.

Figure 5:
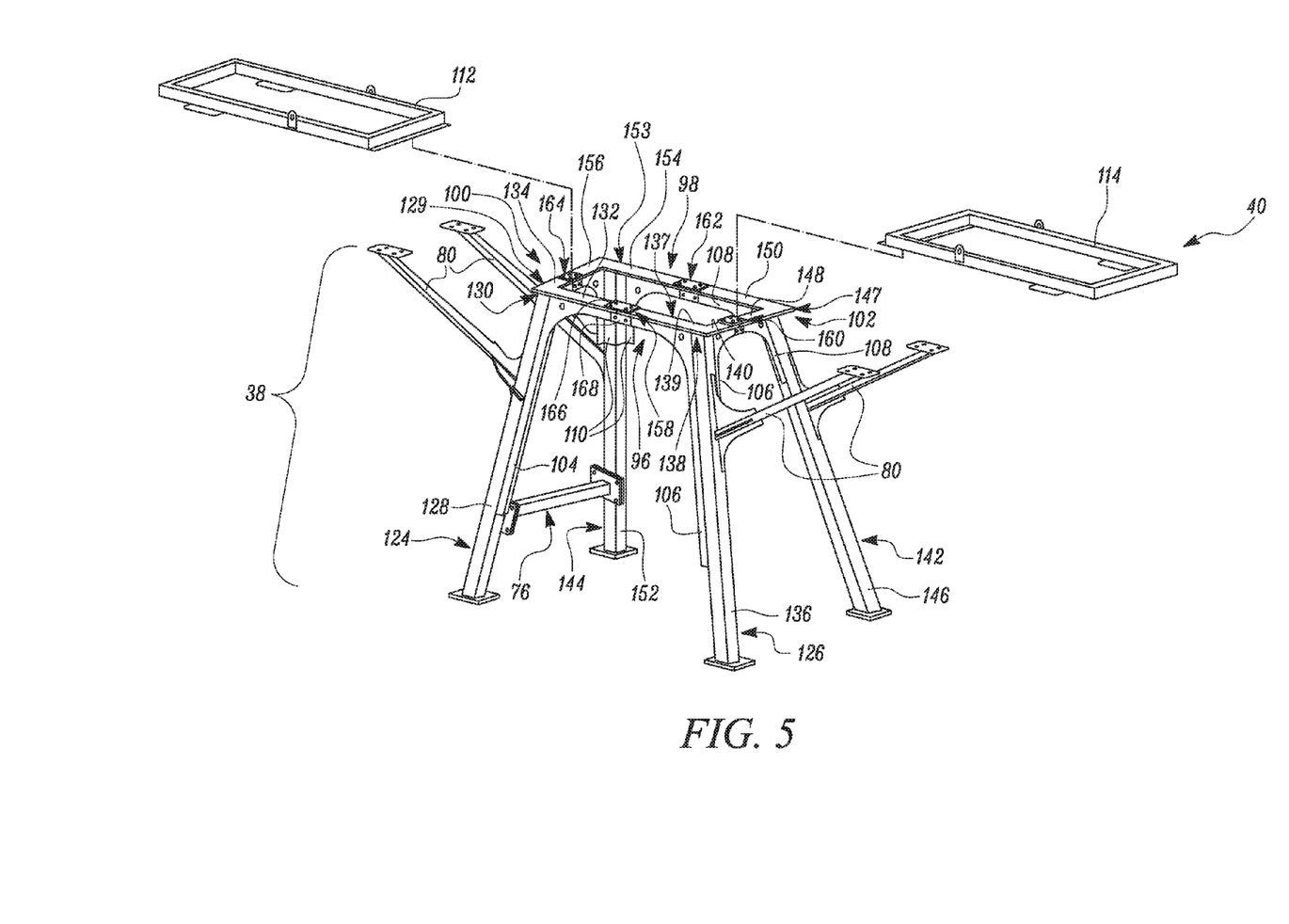
FIG. 5 is a perspective view of a section of the mounting structure, according to another embodiment of the present disclosure.

FIG. 5 is a perspective view of a section of the mounting structure 12, according to another embodiment of the present disclosure. The construction of a pair of secondary front legs 124, 126 of the present embodiment varies from the construction of the pair of secondary front legs 62, 64 of FIGS. 2, 3, and 4. The secondary front leg 124 of the present embodiment may include a first vertical front leg 128 and a first connecting member 129 connected to a top portion 130 of the first vertical front leg 128. The first connecting member 129 includes a first horizontal portion 132 and a second horizontal portion 134. Also, the secondary front leg 126 of the present embodiment may include a second vertical front leg 136 and a second connecting member 137 connected to atop portion 138 of the second vertical front leg 136. The second connecting member 137 includes a third horizontal portion 139 and a fourth horizontal portion 140.

Further, the construction of a pair of rear legs 142, 144 of the present embodiment varies from the construction of the pair of rear legs 72, 74 of FIGS. 2, 3, and 4. The rear leg 142 of the present embodiment may include a first vertical rear leg 146 and a third connecting member 147. The third connecting member 147 includes a fifth horizontal portion 148 and a sixth horizontal portion 150. Also, the rear leg 144 of the present disclosure may include a second vertical rear leg 152, and a fourth connecting member 153. The fourth connecting member 153 includes a seventh horizontal portion 154 and an eighth horizontal portion 156. It should be understood that the first pair of reinforcement members 104, the second pair of reinforcement members 106, the third pair of reinforcement members 108, and the fourth pair of reinforcement members 110 are connected to the pair of secondary front legs 124, 126 and the pair of rear legs 142, 144 in the same manner as explained in FIGS. 2, 3, and 4 of the present disclosure.

As shown in FIG. 5, the middle support structure 38 includes a plurality of fastening systems 158, 160, 162, 164 for connecting the secondary front legs 124, 126 and the rear legs 142, 144. The pair of secondary front legs 124, 126 is connected with each other by the fastening system 158. The pair of rear legs 142, 144 is connected with each other by the fastening system 162. Further, the rear leg 142 is connected to the secondary front leg 126 by the fastening system 160. The rear leg 144 is connected to the secondary front leg 124 by the fastening system 164. For the sake of brevity, the fastening system 158 is described in detail herein with respect to the connection between the pair of secondary legs 124, 126. However, it should be noted that the description provided, is equally applicable to the fastening systems 160, 162, and 164 of the middle support structure 38.

The fastening system 158 includes a horizontal plate 166, a first vertical plate 168, and a second vertical plate (not shown). The horizontal plate 166 is provided to removably fasten the first connecting member 129 with the second connecting member 137. More specifically, the horizontal plate 166 connects the first horizontal portion 132 of the secondary front leg 124 with the third horizontal portion 139 of the secondary front leg 126. When fastened by using the horizontal plate 166, the first horizontal portion 132 and the third horizontal portion 139 together form the front horizontal arm 96 (as shown in FIGS. 2, 3, and 4).

Further, the first vertical plate 168 and the second vertical plate are provided to fasten the first pair of reinforcement members 104 with the second pair of reinforcement members 106. The first vertical plate 168 and the second vertical plate are positioned on opposite faces of the first pair of reinforcement members 104 and the second pair of reinforcement members 106 in such a manner that the first pair of reinforcement members 104 is removably fastened to the second pair of reinforcement members 106.

Similarly, the fastening system 160 removably fastens the fourth horizontal portion 140 and the fifth horizontal portion 148 to form the second side arm 102 (as shown in FIGS. 2, 3, and 4). The fastening system 162 removably fastens the sixth horizontal portion 150 and the seventh horizontal portion 154 to form the rear horizontal arm 98 (as shown in FIGS. 2, 3, and 4). The fastening system 164 removably fastens the eighth horizontal portion 156 and the second horizontal portion 134 to form the first side arm 100 (as shown in FIGS. 2, 3, and 4). The front horizontal arm 96, the first side arm 100, the rear horizontal arm 98, and the second side arm 102 together form the deck 78.

It should be noted that the constructional details of all other components of the mounting structure 12 of FIG. 5 are similar to the constructional details of the mounting structure 12 of FIG. 2.

INDUSTRIAL APPLICABILITY

The present disclosure relates to the mounting structure 12 for supporting the pantographs 34 in the machine 10. The mounting structure 12 includes the bottom support structure 36, the middle support structure 38, and the top platform 40. The bottom support structure 36 is removably mounted on the bumper 26 of the machine 10. The middle support structure 38 includes the secondary front legs 62, 64 removably fastened to the primary front legs 42, 44 of the bottom support structure 36. The middle support structure 38 also includes the rear legs 72, 74 removably fastened on the platform 28 of the machine 10. The middle support structure 38 also includes the deck 78 removably fastened to the secondary front legs 62, 64 and the rear legs 72, 74. The top platform 40 includes the first supporting member 112 and the second supporting members 114. The first supporting member 112 and the second supporting member 114 are removably fastened to the deck 78 of the middle support structure 38.

The mounting structure 12 of the present disclosure includes fewer components that reduce the weight of the mounting structure 12 and in turn of the machine 10. The mounting structure 12 includes the first, second, third and fourth pair of reinforcement members 104, 106, 108, 110 for fastening the secondary front legs 62, 64, the rear legs 72, 74, and the deck 78, thereby reducing complexity of the mounting structure 12 and improving visibility of the operator while driving the machine 10. Further, the mounting structure 12 provides improved modularity as fasteners are used for coupling multiple components of the mounting structure 12, thereby reducing the complexity related to transportation, installation and uninstallation of the mounting structure 12. Due to improved modularity, the mounting structure 12 can be dismantled into smaller parts or modules with higher ease for the purpose of transportation. The present disclosure offers the mounting structure 12 that is simple, effective, easy to use, economical, less complex, and time saving.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A mounting structure for supporting one or more pantographs in a machine, the mounting structure comprising:

a bottom support structure including:
  a pair of primary front legs;
  a first horizontal arm connected to a top portion of the pair of primary front legs; and
  a pair of supporting legs connected between the first horizontal arm and a bottom portion of the pair of primary front leas, wherein the pair of primary front leas, the first horizontal arm, and the pair of supporting legs are coupled to each other by a welding connection;

a middle support structure, removably mounted on the bottom support structure, including:
  a pair of secondary front legs detachably coupled to the pair of primary front legs of the bottom support structure by a fastening member;
  a pair of rear legs coupled to the pair of secondary front legs by a deck, the deck is disposed on a top portion of the pair of secondary front legs and the pair of rear legs, wherein the deck includes a front horizontal arm, a rear horizontal arm, a first side arm, and a second side arm;
  at least one support bar connected between one of the pair of secondary front legs and one of the pair of rear legs; and
  at least one reinforcement member, disposed along a length of the deck, for connecting the top portion of one of a secondary front leg and a rear leg with the deck,
  wherein the pair of secondary front legs, the pair of rear legs, the at least one support bar, and the deck are detachably coupled to each other by a fastening connection; and a top platform, removably mounted on the middle support structure, for supporting the one or more pantographs, the top platform including a first supporting member and a second supporting member spaced apart from the first supporting member, wherein each of the first supporting member and the second supporting member is supported on the first side arm and the second side arm of the deck of the middle support structure, respectively.

* * * * *

UNITED STATES PATENT AND TRADEMARK OFFICE
CERTIFICATE OF CORRECTION

PATENT NO.       : 9,550,424 B2
APPLICATION NO.  : 15/015147
DATED            : January 24, 2017
INVENTOR(S)      : Goldwin et al.

It is certified that error appears in the above-identified patent and that said Letters Patent is hereby corrected as shown below:

In the Claims

Column 8, Line 7, In Claim 1, delete "leas," and insert -- legs, --.

Column 8, Line 8, In Claim 1, delete "leas," and insert -- legs, --.

Signed and Sealed this
Thirtieth Day of May, 2017

Michelle K. Lee
*Director of the United States Patent and Trademark Office*